United States Patent
Gomes et al.

(10) Patent No.: US 7,519,604 B2
(45) Date of Patent: Apr. 14, 2009

(54) TROUBLESHOOTING ENGINE AND METHOD FOR USING SAME

(75) Inventors: Clemilton Gomes, Manaus (BR); Robson Lisboa, Manaus (BR); Jeffrey Mazon, San Diego, CA (US)

(73) Assignee: Nokia Corporation, Espoo (FI)

( * ) Notice: Subject to any disclaimer, the term of this patent is extended or adjusted under 35 U.S.C. 154(b) by 1226 days.

(21) Appl. No.: 10/652,057

(22) Filed: Aug. 29, 2003

(65) Prior Publication Data
US 2005/0050096 A1    Mar. 3, 2005

(51) Int. Cl.
G06F 17/30    (2006.01)
(52) U.S. Cl. .............................. 707/100; 707/3; 707/10
(58) Field of Classification Search .................. None
See application file for complete search history.

(56) References Cited

U.S. PATENT DOCUMENTS

| | | | |
|---|---|---|---|
| 4,874,963 A | 10/1989 | Alspector | |
| 5,251,268 A | 10/1993 | Colley et al. | |
| 5,353,238 A | 10/1994 | Neef et al. | |
| 5,467,428 A | 11/1995 | Ulug | |
| 5,528,516 A | 6/1996 | Yemini | |
| 5,566,092 A | 10/1996 | Wang et al. | |
| 5,586,033 A | 12/1996 | Hall | |
| 5,761,383 A | 6/1998 | Engel et al. | |
| 5,850,066 A | 12/1998 | Dew et al. | |
| 6,070,155 A * | 5/2000 | Cherrington et al. | ........ 705/400 |
| 6,249,755 B1 | 6/2001 | Yemini et al. | |
| 6,269,354 B1 | 7/2001 | Arathorn | |
| 6,563,301 B2 | 5/2003 | Gventer | |
| 6,662,179 B2 * | 12/2003 | Benjamin et al. | ............... 707/3 |
| 6,853,981 B1 * | 2/2005 | Radosevich et al. | ........... 705/27 |
| 6,895,551 B1 * | 5/2005 | Huang et al. | ................. 715/205 |
| 7,054,841 B1 * | 5/2006 | Tenorio | ....................... 705/57 |
| 2001/0043237 A1 * | 11/2001 | Schmieder | ................... 345/839 |
| 2002/0077844 A1 * | 6/2002 | Hayashi | ........................ 705/1 |
| 2003/0023611 A1 * | 1/2003 | Benjamin et al. | ........... 707/101 |
| 2003/0046174 A1 * | 3/2003 | Goldsmith et al. | ............ 705/26 |

(Continued)

OTHER PUBLICATIONS

Penagarikano et al. Speech-to-text translation by a non-word lexical unit based system, Signal Processing and its Application, Aug. 22-25, 1999, pp. 111-114.*

(Continued)

*Primary Examiner*—Baoquoc N To
(74) *Attorney, Agent, or Firm*—Alston & Bird LLP

(57) ABSTRACT

A system for using a troubleshooting engine to assemble an interactive multimedia repair guide for assisting a service technician in the repair of a defective product, and a mehof of using the same. The system includes a dynamic knowledge database for storing product history records relating to defects reported concerning the product. The database also contains design information related to the product for correlation with the defect reports and use in analyzing future reported defects. A product performance counter (PPC) analysis module receives PPC data from an individual product, generates a PPC profile based on the received data, and compares the profile to stored design and historical PPC profiles to produce a weighted prediction report of likely defects. This report is transmitted to the troubleshooting engine, which directs a multimedia application to transmit diagnosis and repair instructions to a service center technician. The database is formed of separate portions, embodied at separate geographical locations and storing records in different languages.

20 Claims, 7 Drawing Sheets

U.S. PATENT DOCUMENTS

2005/0240555 A1* 10/2005 Wilde et al. .................... 707/1

OTHER PUBLICATIONS

Bohannon et al. A cost-based model and effective heuristic for reparing constraints by value modification, International Conference on Management of Data, proceeding of the 2005 ACM SIGMOD international conference on Management of data, 2005, pp. 143-154.*

Pires, J. Norberto, "Remote Monitoring and Inspection of Robotic Manufacturing of Cells" Advanced Intelligent Mechatronics Proceedings, Jul. 8-12, 2001, pp. 551-553, IEEE, Como, Italy.

Neves, Jose, and Paulo Cortez, "An Artificial Neural Network—Genetic Based Approach for Time Series Forecasting", 1997, pp. 9-13, IEEE, Largo do Paco, Portugal.

Garnder, Mike, and Jack Bieker, "Data Mining Solves Tough Semiconductor Manufacturing Problems", 2000, pp. 376-383, KDD, Boston, Massachusetts.

Murray, Shari, Gerald T. Mackulak, John W. Fowler, and Theron Colvin, "A Simulation-Based Cost Modeling Methodology for Evaluation of Interbay Material Handling in a Semiconductor Wafer Fab", Proceedings of the 2000 Winter Simulation Conference, 2000, pp. 1510-1517, Dept. of Industrial Engineering, Arizona State Univ., Tempe, Arizona.

* cited by examiner

TROUBLESHOOTING ENGINE AND METHOD FOR USING SAME

This invention relates generally to the service and repair of defective products, and more specifically to a system and method for the providing a network-based interactive multimedia repair guide for use in addressing reported product defects at remote service facilities.

BACKGROUND OF THE INVENTION

For many mass-market, that is, very widely distributed consumer products, the chain of product development, design, production, and distribution follows a familiar pattern. The pattern is followed because sales of hundreds, even thousands of the same or very similar products are expected to be sold through a great many retail stores. Products are designed by one group of people, manufactured by others—perhaps even a different company entirely—and then shipped for distribution and sale. Distribution is usually through regional, then local distribution centers, and finally to the retail outlets where they will be sold. In this type of market, the people at one end of the chain often have very little direct contact with those at the other. In any such scheme, a certain number of product defects of uncertain origin are likely to go undiscovered until they appear at the retail level, either before or after the product is sold to a consumer. A customer who discovers a product defect cannot possible know where in the chain the defect originated, so problems perceived at this level are generally first dealt with the retail outlet where the item was purchased or a local service center. Unfortunately, these members of the chain are the ones most distant from the design and manufacturing groups where the defects were very likely introduced.

Moreover, mass-market products are ubiquitous in the modern world. Where once a single electrical device such as a radio, television, or telephone might be among a family's most prized possessions, many homes are now filled with literally dozens of such devices. Correspondingly, the number of retail outlets at which electrical devices such as mobile phones, personal digital assistants (PDAs), calculators, computers, DVD players, and the like, are sold has also increased dramatically. Such retail outlets may no longer specialize in a particular line of electrical devices, but may sell them as part of a wide selection of household goods.

A typical feature of modern retailing, however, is the consumer's ability to bring a previously-purchased product back to the retailer and obtain a refund of the purchase price or some other consideration. This works to the consumer's advantage especially when a defective product has been purchased. It may also work to the advantage of the manufacturer when, instead of employing extensive (and expensive) measures to ensure every device is in perfect working order, an easy return or exchange process means that a higher number of defective products may be acceptable to the public at large. Returned products are not simply scrapped, however. Some can be repaired and resold, presumably having been restored to the originally-intended level of quality. And some "returns" are not defective at all, but simply returned because they did not meet the customers' needs for other reasons.

Returns are not without cost, however, when a customer brings back a product and claims it is defective. An attempt may first be made at a quick repair. To do this, an accurate description of the defect must be given, and an appropriate fix performed. Note, however, that in most, if not all, cases, the consumer will report only symptoms of a defect—the unacceptable performance they encountered. They have little or no way of actually determining the root cause of this unacceptability, that is, the actual defect. Not being experts, consumers may be susceptible to misreporting symptoms of the defect, making diagnosis all that more difficult. Moreover, customers who wish to return products may intentionally misreport problems out of a fear that their return for other reasons will not otherwise be accepted. And of course, with most defects in electronics devices, the presence or absence of a defect is not normally easy to identify by simple visual inspection.

Ultimately, this means that dozens, even hundreds of technicians are forced to address problems and cure defects occurring in products that that they had no part in creating and that many times they may be only generally familiar with. Moreover, because thousands of units of a product may be manufactured and shipped in a short period of time, there is a high probability that many of these technicians are independently addressing the same defects as other, distant technicians, and independently having to discover the same or similar solutions.

Reported defects may be real, or result from the consumer's unrealistic expectations or inability to properly operate the product. Real defects include both those endemic to the entire line of products—perhaps due to a design or manufacturing flaw—and those related only to certain individual products, or a relatively small set of the total number manufactured. Whatever the type or origin of the defect (this term herein meant to include both real and imagined defects unless otherwise specified or apparent from the context), the myriad and scattered service technicians will have to address it with little outside guidance, at least initially. Although these technicians are free to call others, or to contact the engineers or factory representatives, they cannot efficiently engage in extensive research and study to determine the cause each and every reported problem and work out optimum solutions. As a result, there exists little or no easy way to efficiently benefit from the experiences of others.

One way in which this issue has been addressed is through what may be referred to as a "reporting and bulletin" system. Over the life of a commercial product, any problems commonly encountered are usually reported to a central service site. The problem report may include not only a description of the problem, but a proposed solution or suggestion as well. Or the central service facility may analyze common defects in an effort to come up with an appropriate way to address them. When sufficient data has accumulated, a service bulletin can be issued to all of the service technicians to provide them with guidance on how to deal with the particular problem covered in the bulletin.

Unfortunately, this method, however reliable, is often too slow to react to problems encountered with newly-released products, especially in industries where new releases are frequent. Only after sufficient time has elapsed will enough service bulletins have been issued to cover the vast majority of problems that are likely to be encountered. When a product (and the defects endemic to it) is very new, there is still very little to report in a service bulletin, and the collection and dissemination process does take a certain amount of time. As a result, situations arise frequently where an unknown defect is reported at a service center, and has to be handled without benefit of the collective experience that the service bulletins represent. This will remain the case until a quantity of experience has been amassed, reported, and incorporated into a service bulletin. This time delay, however, is unacceptable in industries such as the present wireless telephone industry, where new product releases occur very frequently. In such industries, the state of the underlying technology often advances so fast that even products released in the past one or two years are nearing obsolescence. By the time that recurring problems have been sufficiently documented and solutions proven, it is very nearly time for release of the next generation of products.

Needed, then, is an inexpensive and efficient method of rapidly developing a centralized database, along with an intelligent problem-solving routine to enable widely distributed service centers to more quickly and efficiently be able to handle problem reports, especially those associated with a new product release.

SUMMARY OF THE INVENTION

It is an object of the present invention to provide an efficient problem-resolution system and methodology usable by service technicians for assistance in the repair of defective products.

It is another object of the present invention to provide the efficient problem-resolution system and methodology usable by service technicians positioned at widely-dispersed locations that provides problem-resolution information in languages selected by the service technicians.

In one aspect, the present invention is a troubleshooting engine including a multimedia session assembly module for assembling an interactive multimedia repair guide. The troubleshooting engine further includes a communication module for communicating with the service technician to receive information related to the defective product, a memory device for storing at least some of the received information so that it can be referred to when assembling the repair guide, and a multimedia library from which to draw prepared multimedia materials that may be used in multimedia repair guide assembly.

In another aspect, the present invention is a distributed service system having a troubleshooting engine in communication with a database for storing historical repair and product design information that the troubleshooting engine may refer to in preparing a repair guide for use by a service technician attempting to perform repairs on a defective product. The repair guide is preferably an interactive multimedia repair guide, and information gathered during the interactive repair session is used to supplement the historical repair information in the database. In a particularly preferred embodiment, the system also includes a PPC analysis module for analyzing any PPC counts provided by the defective product and fed to the PPC analysis module.

In yet another aspect, the present invention is a method of assisting a service technician attempting to repair a defective product that includes the steps of providing a troubleshooting engine, collecting information related to the product defect, transmitting the information to the troubleshooting engine, and using the information to assemble an interactive multimedia repair guide for transmission to the service technician. The method may further include providing an historical knowledge database in communication with the troubleshooting engine for storing historical repair data that also may be used by the troubleshooting engine in assembling the repair guide. Information gathered during execution of the repair process is provided to the database so that the historical data may be supplemented.

In a further aspect, the present invention comprises a distributed service system, and an associated method, for assisting service technicians in performing repairs on a product. A first database stores first selected historical information in a first selected language. The first selected historical information comprises first product repair information reported by a first service technician after performing repairs on another product similar to the product being repaired. At least a second database stores at least second selected historical information in at least a second selected language. The second selected historical information comprises second product repair information reported by at least a second service technician, also after performing repairs on another product similar to the product being repaired. The databases are embodied, e.g., at servers located at first and at least second sites. The languages in which screens and information appear are registration-dependent. That is to say, a language is associated with the registrant, e.g., the service technician. The databases are inter-coupled to permit the data stored on any one to be replicated on the others. A troubleshooting engine is in communication with the first database and the at least the second database. The troubleshooting engine forms a structured tree of knowledge about a problem, populated with information entered into, and stored at, the databases. The structured tree defines, e.g., a repair guide based at least in part on the received information and on selected information of the first selected historical information and the at least the second selected historical information. The structured tree permits all technicians that have access to the tool to start a process of collective reasoning of a defined problem in a defined product. The technicians are permitted to reason and analyze the defined problem collectively even if the technicians are positioned disparate locations and review the materials set forth therein at separate times.

DETAILED DESCRIPTION OF THE INVENTION

Figure 1:
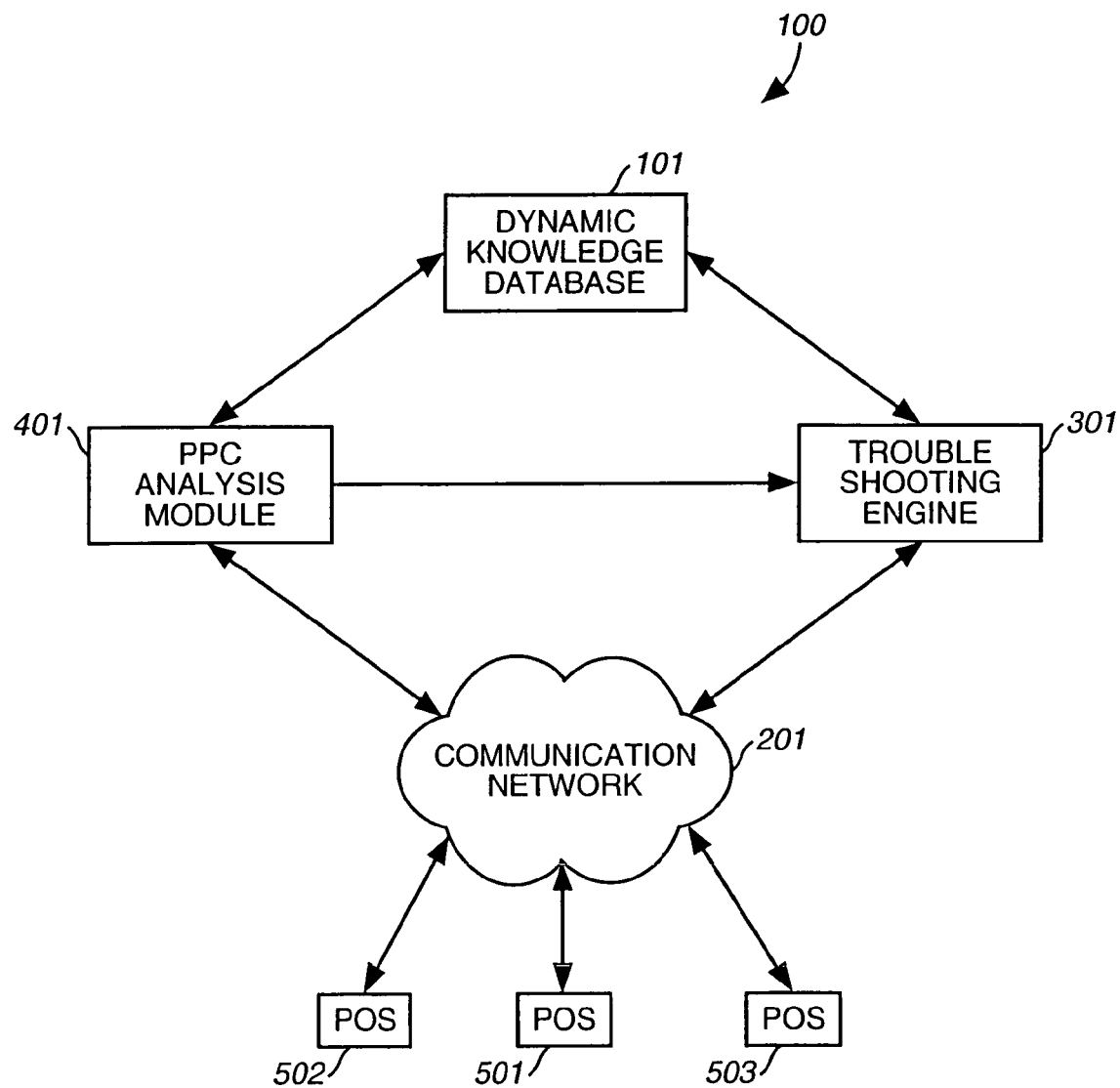
FIG. 1 is a block diagram of an intelligent distributed service system incorporating the troubleshooting engine according to an embodiment of the present invention.
Figure 2:
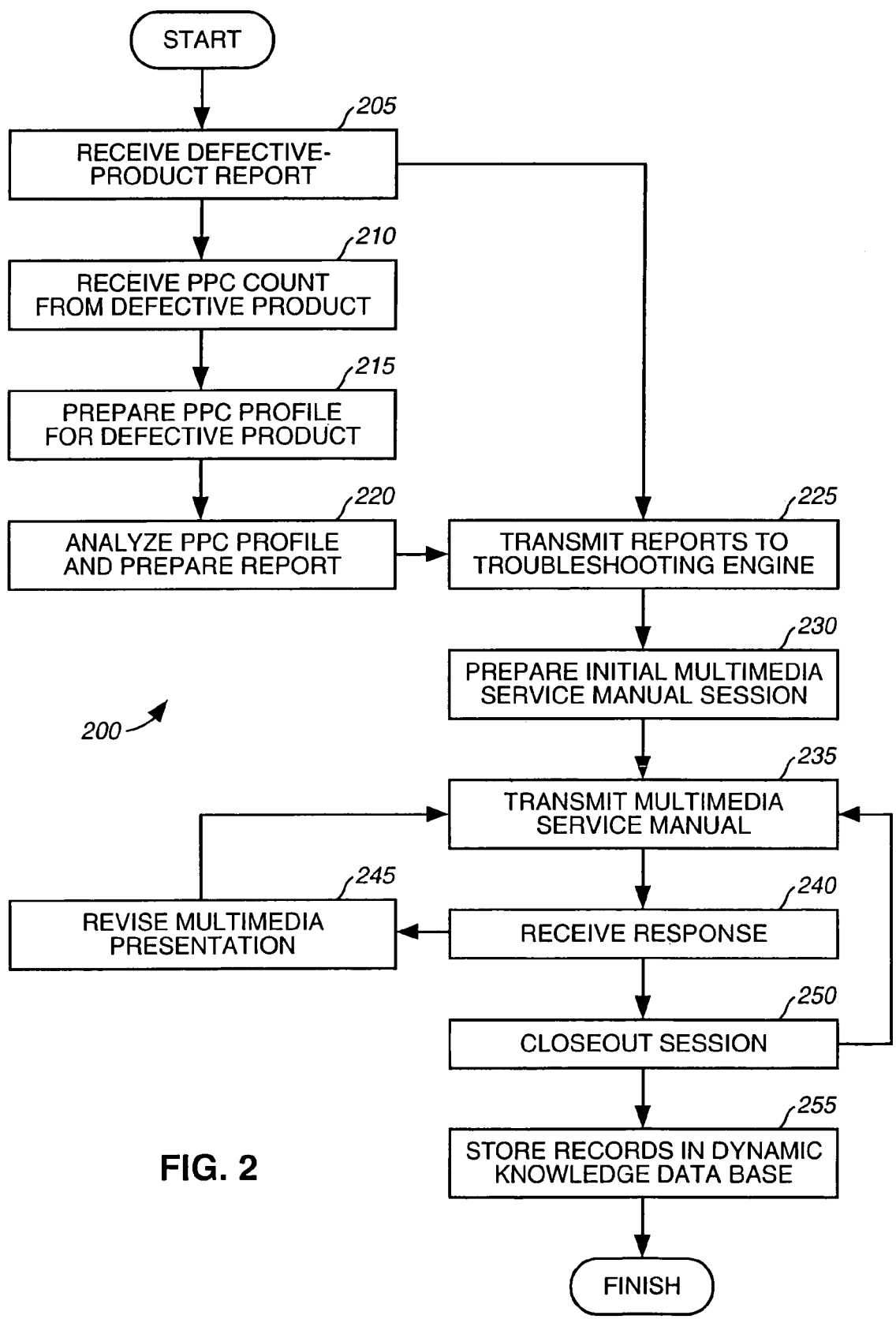
FIG. 2 is a flow chart illustrating an embodiment of a distributed service system repair process according to an embodiment of the present invention.
Figure 3:
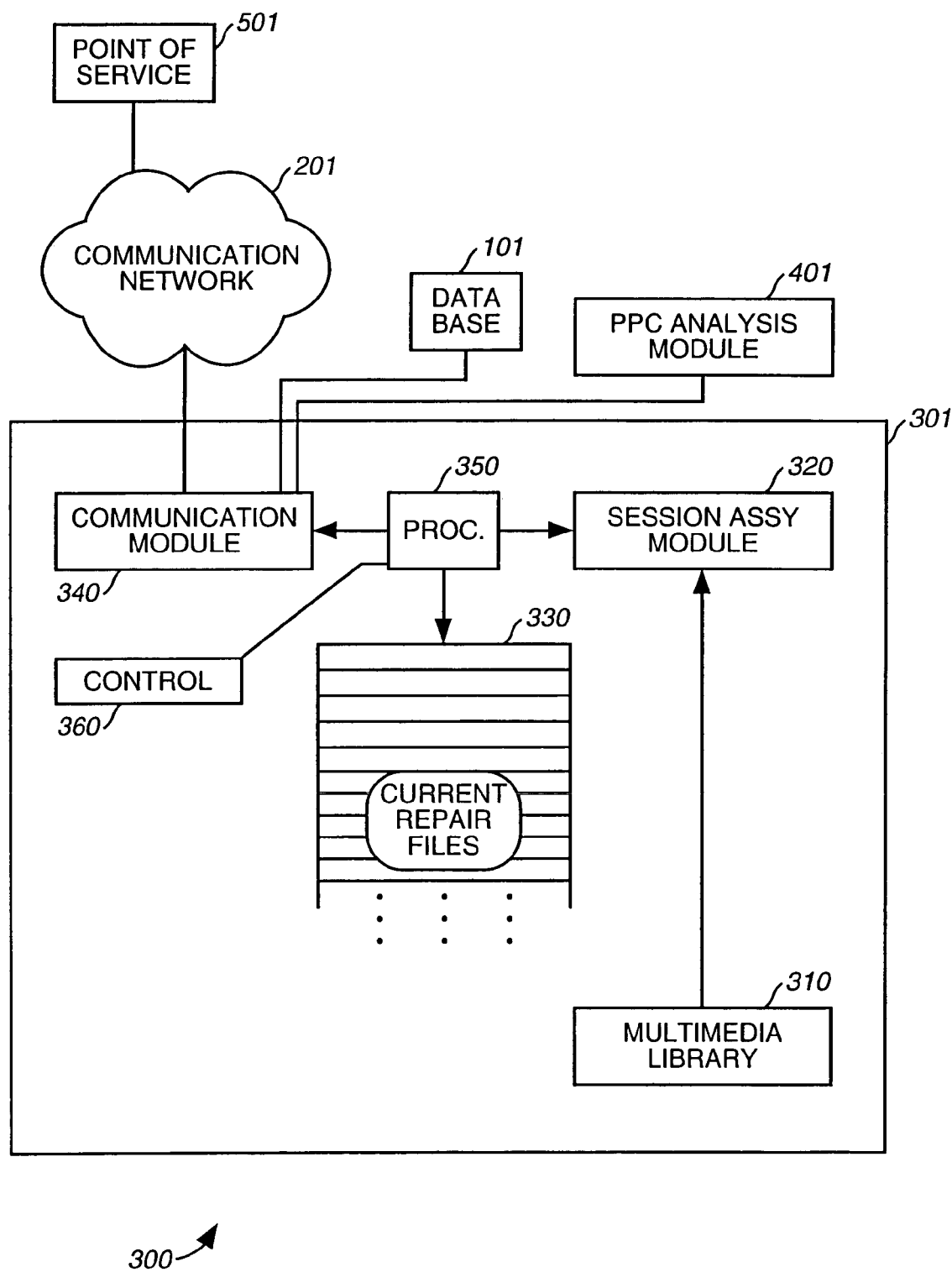
FIG. 3 is a block diagram illustrating the major components of an exemplary troubleshooting engine configured in accordance with an embodiment of the present invention.

FIGS. 1 through 3, discussed below, and the various embodiments used to describe the principles of the present invention in this patent document are by way of illustration only and should not be construed in any way to limit the scope of the invention.

FIG. 1 is a block diagram of an intelligent distributed service system 100 incorporating a troubleshooting engine 301 according to an embodiment of the present invention. Note the present invention is directed both to a troubleshooting engine specifically, and as well to its application in a system such a distributed service system 100. Distributed service system 100 includes dynamic knowledge database 101, which is a constantly updated knowledgebase of information relating to previously encountered defects (again, real and imagined) along with both proposed, and proven solutions for addressing them. Knowledge database 101 is updated both automatically by system 100 and manually by engineers and service personal as new problems are encountered and their solutions developed. Dynamic knowledge database 101 is preferably an organized database of an organization's entire collective remedial-action experience. In part this experience is documented and collected as in the past, by service technicians generating defect reports that are submitted to a central department for analysis. In addition, however, certain information is collected automatically as the repair process is interactively guided by the by troubleshooting engine 310.

Complimenting dynamic knowledge database 101 is PPC analysis module 401. PPC analysis module 401 receives input obtained from the defective product itself, including (though not limited to) the contents of a product's product-performance counters (PPCs). Armed with this data, PPC analysis module 401 prepares a product profile based on the PPC contents, and any other inputs it receives, and compares this profile to others represented in the design and collective-experience data in dynamic knowledge database 101. Based on this comparison alone, it may be possible to determine precisely the cause of the reported problem, although more likely a number of possible causes will be identified, each consistent with the received PPC data. Each possible defect cause may be ranked, again with reference to the knowledge accumulated on dynamic knowledge database 101 to indicate if determinable which cause is most likely to be correct, then which is next most likely, and so forth. In a particularly preferred embodiment, this ranking includes a relative certainty value, indicating how much more likely the defect is a result of one cause as opposed to another. This ranking and, when present, an associated certainty value may be reported to the service technician to aid in their analysis. In this embodiment, when a certain cause is associated with a sufficiently high probability, any other alternatives may simply go unreported, or may be reported only on request. The service technician in this way can eliminate from view distracting and probably unnecessary information. In another embodiment, the ranking and certainty information is used only for the purpose of directing repairs through the interactive service guide.

Communication network 201 is a network connecting the PPC analysis module 401 and the various points of service (POSs) such as POS 501, POS 502, and POS 503. Communication network 201 is very likely to include the Internet (and any necessary access channels), but may also be, where useful, a local area network (LAN), a wide area network (WAN), a virtual private network (VPN), or some other public or private communication network. The greatest advantage obtains, however, when the communication network 201 selected is the most efficient and reliable way to connect the POSs and the other components of distributed service system 100. The Internet typically fulfills these criteria, but may not always be the optimum network. Of course, the network does not have to be either homogenous or static, and separate POSs may access the rest of the system by different and changing means.

Note that although three POSs are shown, there could be any number; very likely there are dozens, even hundreds. Some may be nearby, others distant. Some may be relatively permanent, while others are mobile, occasional, or purposefully in existence only for a short time. A POS may even effectively be in more than one location (not shown), such as where a product brought into one location is being remotely examined by a service technician in another. Naturally, the nature of the network connection to each POS through communication network 201 may vary according to the aforementioned factors. In some instances, some or all of the system 100 may be replicated for ease of access, or provided on a removable storage media (such as a CD) for use even if continuous communication is not possible or desirable. Note also that certain POSs may be provided with more or less service relative to others, or each permitted to have access to only a certain amount of information. This may be a useful limitation where a particular POS also services the products of competitors.

Troubleshooting engine 301 is at the heart of the distributed service system 100 because it takes the information stored and generated by the other system components and applies it to a process for assisting the service technician who is addressing the defective product. Specifically, troubleshooting engine 301 receives the report produced by PPC analysis module 401 and uses the defect-prediction information contained in it, along with the design and collective-experience information on database 101, to assemble an interactive multimedia guide for use by the service technician so that problems can be quickly diagnosed and, where possible, repaired.

Note that in a preferred embodiment, such as the one of FIG. 1, dynamic knowledge database 101, troubleshooting engine 301, and PPC analysis module 401 are preferable linked to one another and co-located. They may actually reside in the same physical device and share its resources. The various POSs, on the other hand, are often remotely located and connected to the remainder of system 100 by communication network 201. This configuration is not required, however, and in an alternate embodiment, a POS (not shown) may be nearby and directly connected (or even share the same physical unit). Likewise, dynamic knowledge database 101, troubleshooting engine 301, and PPC analysis module 401 may be remote located from one another and, if so, may rely on communication network 201 as well.

Turning to FIG. 3, there appears a block diagram illustrating the major components of an exemplary troubleshooting engine 301 configured in accordance with an embodiment of the present invention. Troubleshooting engine 301 includes a communication module 340 for sending and receiving communications through the communications network 201, through which it maintains contact with one or more POS (such as POS 501 shown here). Note again that communications network 201 may include segments of different communications networks, including the Internet, a VPN, satellite network, or the like, that is capable of handling multimedia communications between troubleshooting engine 301 and point of service 501. Generally, this communication channel will be the one through which the interactive multimedia repair guide session is conducted, although any other channel may be used as well, for example one established through PPC analysis module 401, as necessary or desirable under the circumstances. Preferably, communications module 340 is capable of transmitting and receiving through a variety of network configurations, and may in fact be capable of quickly switching from one to another if a certain channel is for some reason interrupted or unavailable.

Troubleshooting engine 301 also includes a multimedia service manual assembly module 320, a multimedia library 310, and current-repair file 330. When a problem report is received and processed (see FIG. 2 and the discussion of it below), the results are sent to troubleshooting engine 301, either through a direct connection if the basic components of the distributed service system 100 (see FIG. 1) are physically co-located with troubleshooting engine 301, or through communications network 201. Any other relevant information may also be sent to troubleshooting engine 301 at this time if it has not already been transmitted. This information is stored in current repair files 330. There may, of course, be many repair sessions being conducted simultaneously, and current repair files 330 maintain data relating to each of them for use by any of the system 100 components as needed. Session assembly module 320, for example, uses this information to assemble an interactive multimedia service manual customized for the particular product being addressed, and for the defect symptoms encountered (as reported or as generated by the PPC analysis). Although current repair files 330 will ordinarily not themselves store all of the of the multimedia service manual used in a given session, the files will usually maintain a record of what content has been transmitted to point of service 501, and also the responses received in return. (Note again that although only one point of service is shown, there could be any number of them.) Processor 350 under the direction of control program 360 refers to current repair files 330 in order to properly direct the session assembly module 320 in assembling the multimedia repair session, for example by indicating which suggestion to make or what additional information to request. Finally, multimedia library 310 contains various pre-developed multimedia-presentation content for use by session assembly module 320 in preparing an ongoing multimedia session.

Turning now to FIG. 2, there appears a flow chart illustrating an embodiment of a distributed service system repair process 200 according to an embodiment of the present invention. Initially (START), it is presumed that products are provided with product performance counters (PPCs) either at manufacture or by retrofit. The "product" may be any type of product, but the process of the present invention is most advantageously employed in connection with mass-distribution consumer electronics products such as mobile phones, computers, personal digital assistants (PDAs), televisions, and similar products. (Large customized products, in contrast, are less likely to be serviced in a widely-distributed service system.) A PPC is an internal detector that can be used to detect the occurrence of a certain event in the product, especially one that can be associated with a given defect. The detector is associated with a counter in non-volatile memory, where the number of times a certain event occurs is tracked. A time and data stamp or clock time may be associated with the PPC so that when an event occurs can be tracked as well, or at least its frequency as related to device-operation time. A given device will normally have numerous PPCs, each tracking the occurrence of different events. For example, in the mobile phone environment, PPCs can be used to measure events such as dropped calls, access-attempt failure, software and hardware resets, and origination failures. Each of these events is a symptom, of course, and not an actual defect. In combination with statistics related to device operation, such as call and standby time, minutes being recharged, etc., however, PPCs can be used to construct a profile of the device's operational life.

As mentioned above, a PPC-based profile is used in the diagnostic portion of the quality control process by comparing it to an analogous profile for a device known to be defect-free, or to profiles of devices having a known defect. Based on this analysis alone, it may be possible to predict with a measurable amount of certainty the root cause of a problem. Again, PPCs cannot detect defects directly, but can be used to statistically predict what the defect will be, or at least provide a course of action most likely to find the defect and result in an effective repair.

Step 205, data accumulation, generally occurs in all PPC-equipped devices, both satisfactory and defective, while they are in the user's (or in some instances, the service technician's) possession. The PPC counts are stored in memory until it is full, then new count data is added to memory by discarding selected portions of the data already stored. Step 210 occurs when a product is returned for repair, or alternately when initiated by a customer. Note that products may be returned to the seller for a number of different reasons. One reason, of course, is a real defect that the user wishes to have remedied. At this point, it is usually unknown whether the product will be repaired or replaced, or how long any potential repairs will take. Even if a customer accurately and truthfully reports the problems with operating the product, the determination is not easily made. It is in the interest of both consumer and service center, however, that a course of action be promptly decided on and executed.

A returned product is first connected with a device that can read the PPC memory and report the various PPC counts stored there (step 215). This will frequently be a connection established by a service technician to an appropriate service-center terminal provided for the purpose. In an alternate embodiment applicable to mobile phones and other communicative products, the customer may be provided with a number or electronic address to contact in the event the product's performance appears to be below an acceptable standard. In this embodiment, the product must, of course, be working well enough to establish such contact. When contact is made, the PPC count may be downloaded through whatever communication channel is being used (preferably after the customer somehow indicates their permission to do so). In yet another embodiment, the device can be connected to a properly configured personal computer and the PPC counts automatically transmitted over an Internet connection.

At step 220, a PPC algorithm, formulated for use in analyzing the PPC counts when they are received, is applied to the collected product counts and a result obtained. The PPC algorithm may originally have been written using design specific action and predictive error analysis, but is preferably updated on a regular basis to adjust for experience. In a preferred embodiment, the system 100 is capable of updating the algorithm automatically based on the results of sessions conducted and any other data with which it is provided. As described above, the result preferably includes both a list of possible defects corresponding to these collected data, and a probability of accuracy estimate associated with each of the listed defects.

At step 225, the troubleshooting engine 301 receives the results of the PPC analysis in what may be referred to as a PPC analysis report. This report generally comes from the PPC analysis module 401, but may also be received from the dynamic knowledge database 101 if it was previous compiled and stored there. At this step any other relevant information, such as the defective product report, is also provided unless it has already been transmitted. Note that the defective product report comes largely from the customer, possible one interacting with a service technician, that has been put into a recognizable form for use by the troubleshooting engine 301. Depending on its sophistication, of course, the troubleshooting engine 301 may use input only from a simple form filled out on a computer, audio responses to standard questions, or it may be able to accept "natural language" reports in either text or audio form, or perhaps a through a combination of any of these methods.

Note that as the process 200 is being executed, the service technician may be given the option to terminate it and simply proceed based on the information provided to that point (step not shown). This option may be useful where an obvious solution has become apparent. Assuming this does not occur, however, at this point the troubleshooting engine 301 performs initial assembly of a multimedia presentation for the guidance of the repair technician in starting the repair process (step 230). Note that for convenience herein, "repair" will mean diagnosis, repair, replace and return product to factory, and related operations. Also, while the disclosure is made using the example of a repair technician in a service center, it applies as well to another in a different location, for example, a consumer using a wireless connection involving the product itself in order to transmit PPC data, and a personal computer connected through the internet to receive multimedia instructions. In this sense "service technician" refers to anyone performing a "repair".

The assembly of the multimedia process begins, of course, based on the information originally provided to the troubleshooting engine 301. It will almost always include an interactive portion to elicit responses to specific questions meant to inform the repair process. As with the initial report, these responses may be in any usable form. Once the initial portion of the multimedia presentation is assembled, it is transmitted to the service technician (step 235). The service technician then begins to act on the information and supply the responses required. At the very least, the service technician will presumably respond that the issue has been resolved. The resolution may or may not have been reached with the aid of the troubleshooting engine, but at such time the multimedia session is no longer required. As the service technician responds to the multimedia guide's queries, the responses are transmitted back to the troubleshooting engine (either as they are made, or in a batch after a group of queries have been addressed).

The troubleshooting engine 301 receives the service technician's responses (step 240), and adds them to the data file 330 storing information related to the product whose repair is in process. It also uses the information, either by itself or cumulatively with other stored data, to add to or amend the multimedia guide session (step 245). The revised or supplemented guide is then transmitted back to the service center (step 235). Steps 240, 245, and 235 are repeated as often as necessary. If, at any time in the received responses (step 240), there is an indication that the repair is complete, the process moves on to completion and follow-up (step 250). Here, the repair operation is closed-out, preferably including an analysis of the information stored in the current repair data files to make sure it is complete. If not, a follow-up form is transmitted to the service center (return to step 235). Here also the process steps 240, receiving a response from the service technician, 250 session completion, and 235 transmitting additional information to the service center, may repeat as many times as necessary. In some presumably rare instances, a response received at step 240 will result in a re-opening of the repair process. When it is determined at step 250 that the process is completed, the session is completed and any appropriate historical information is stored in the dynamic knowledge database (step 255).

In another embodiment (not shown) the service technician is regularly provided with (or may request) the opportunity to manually enter observations and suggestions as the repair is being conducted. These may be used for the current session only or saved and applied to the knowledge database 101. Any repair report being submitted may of course be submitted in the multimedia session itself. In one embodiment, the events of the current repair session are stored and automatically used to generate a report, or inserted into a report form that is then presented to the service technician for review. The report as presented may then be amended or supplemented by the technician, although in this case it may be preferable to also maintain an un-amended version for comparison.

Note that the sequence provided above is exemplary, and the steps of process 200 can be performed in any logically consistent order. For example, the multimedia session may begin immediately with a standard introduction, which guides the user through filling out an initial defect report and PPC count download process. Note also that not all of the steps will need to be performed for each repair, for example PPC counts may not be needed where the defect report appears to adequately define the problem.

FIG. 4 again illustrates the intelligent distributed service system 100 of an embodiment of the present invention. Here, again, the system is distributed, connected together by way of the communication network 201. And, the elements shown in prior Figures to form portions of the system again form portions of the system in the embodiment shown in FIG. 4. Namely, a knowledge database 101, a functional troubleshooting engine 301, and a PPC analysis module 401, together with points of service (POSs) 501 are all again shown.

In this embodiment, the database is formed of separate portions, here a database portion 601 embodied at a first geographical area 605, a second database portion 611 embodied at a second geographical area 615, and an nth database portion 621 embodied at an nth geographical area 625. Here, for purposes of illustration, points of service 501 are also positioned at the separate ones of the geographical area 605, 615, and 625.

Figure 4:
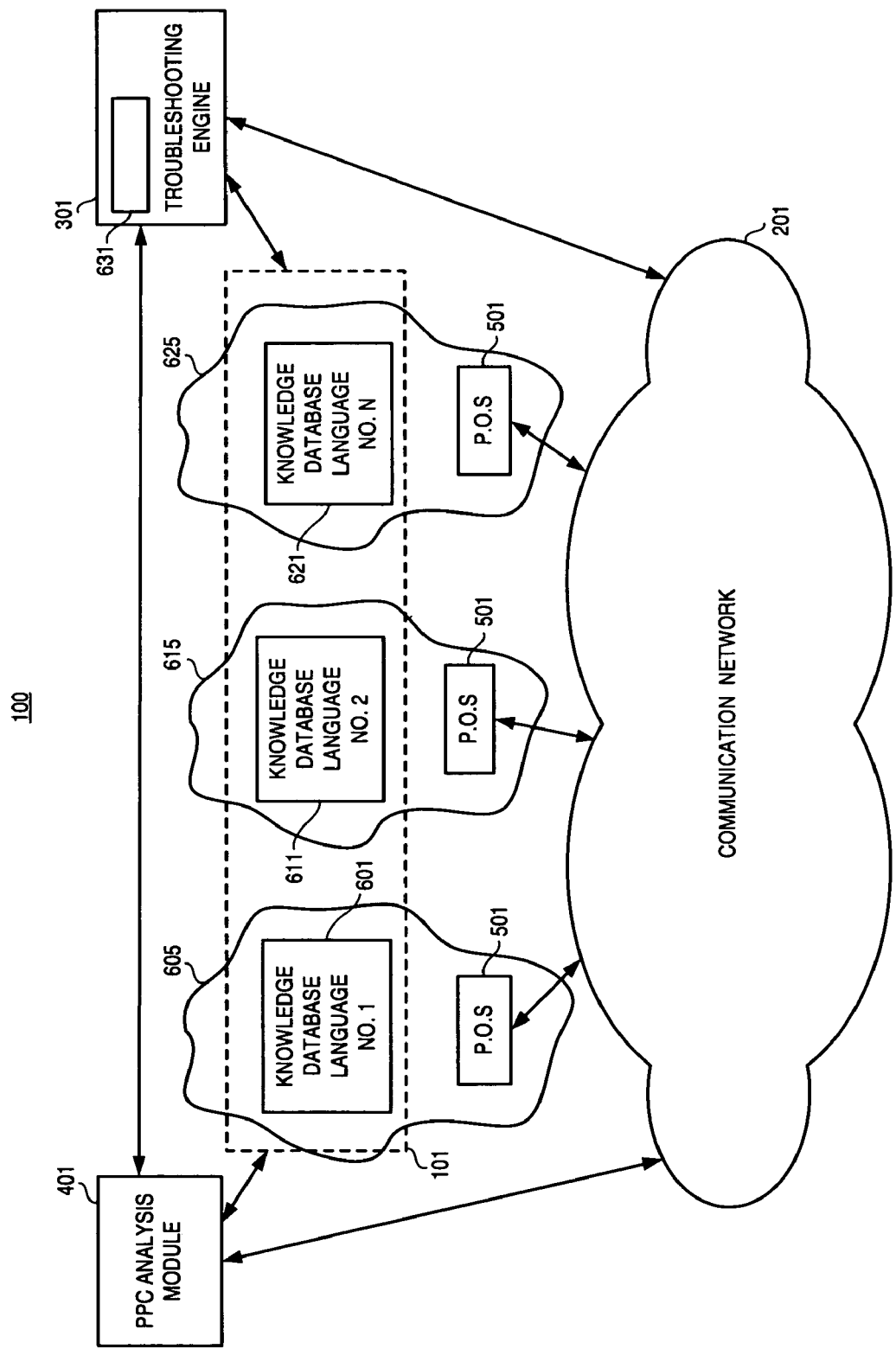
FIG. 4 is a functional block diagram, similar to that shown in FIG. 1, of an intelligent distributed service system incorporating the troubleshooting engine, here according to another embodiment of the present invention.

In the embodiment shown in FIG. 4, the database portions of the knowledge database store informational knowledge in languages that are used in the geographical areas at which the database portions are embodied. While here, the databases are shown to be distributed, the datbases are maintained in at least selective communication connectivity so that the information stored at any of the databases is replicated at the others of the databases. The database portions are all accessible by the troubleshooting engine to retrieve stored knowledge and to store information at any of the database portions pursuant to the replication process and to provide a structured tree of knowledge relating to a problem.

The troubleshooting engine here also further includes a translator 631. The translator operates to translate knowledge into, and from, languages used in the geographical areas at which the database portions are embodied. Information entered by a service technician at a point of service 501 positioned in a geographical area 605, 615, or 625 is entered by the technician in the language that the technician is familiar and the entered information is communicated by way of the communication network to the troubleshooting engine. When reports are prepared, the information is used, translated, if appropriate, to form a report in an appropriate language, available for retrieval by a service technician at any of the points of service. The information is also stored at the database portion, or portions, as appropriate.

Figure 5:
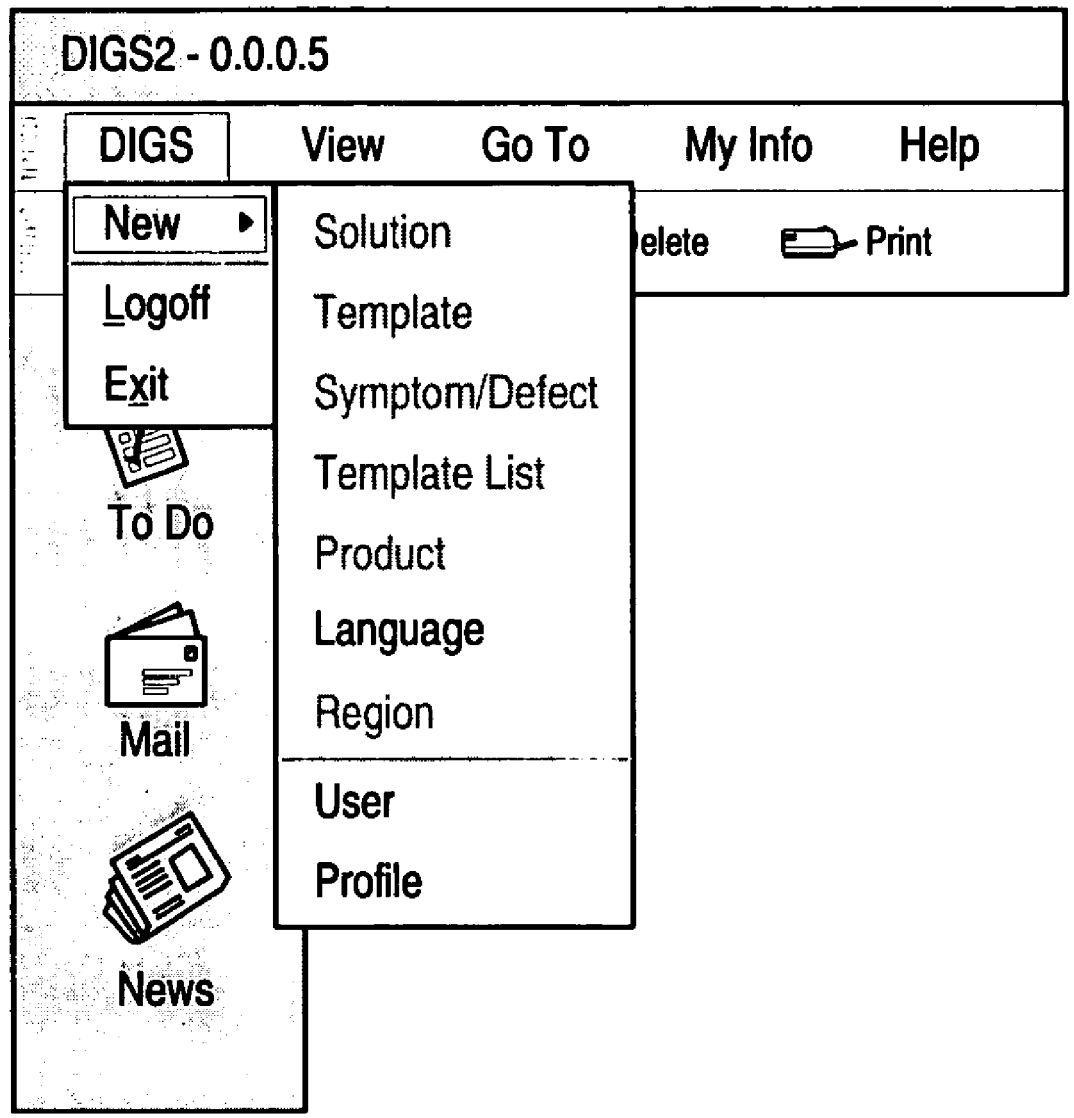
FIG. 5 is a representation of an exemplary display displayed upon a display screen positioned at a point of service of the intelligent distributed service system shown in FIG. 4 during operation of an embodiment of the present invention.

FIG. 5 illustrates an exemplary screen template display, shown generally 650, that is generated and displayed at a user display of a user interface positioned at a point of service pursuant to an embodiment of the present invention. The menu screen includes icons identified as DIGS, View, Go To, My Infor, and Help. And, here, a drop down menu is selected under the DIGS icon. The drop down menu includes New, Logoff, and Exit slections. And, selections available under the New icon in the drop down menu include Language and Region Type. A service technician positioned at a point of service selects any of the icons. An icon is selectable in conventional manner by way of positioning a cursor at the selected icon. The language in which the screen display and information displayed together therewith is registrant dependent. That is to say, the service technician, or other user, is associated, pursuant to his registration, with a particular language. The selected language in which information is displayed is thereby dependent on the party that requests, or is otherwise provided, with information.

Figure 6:
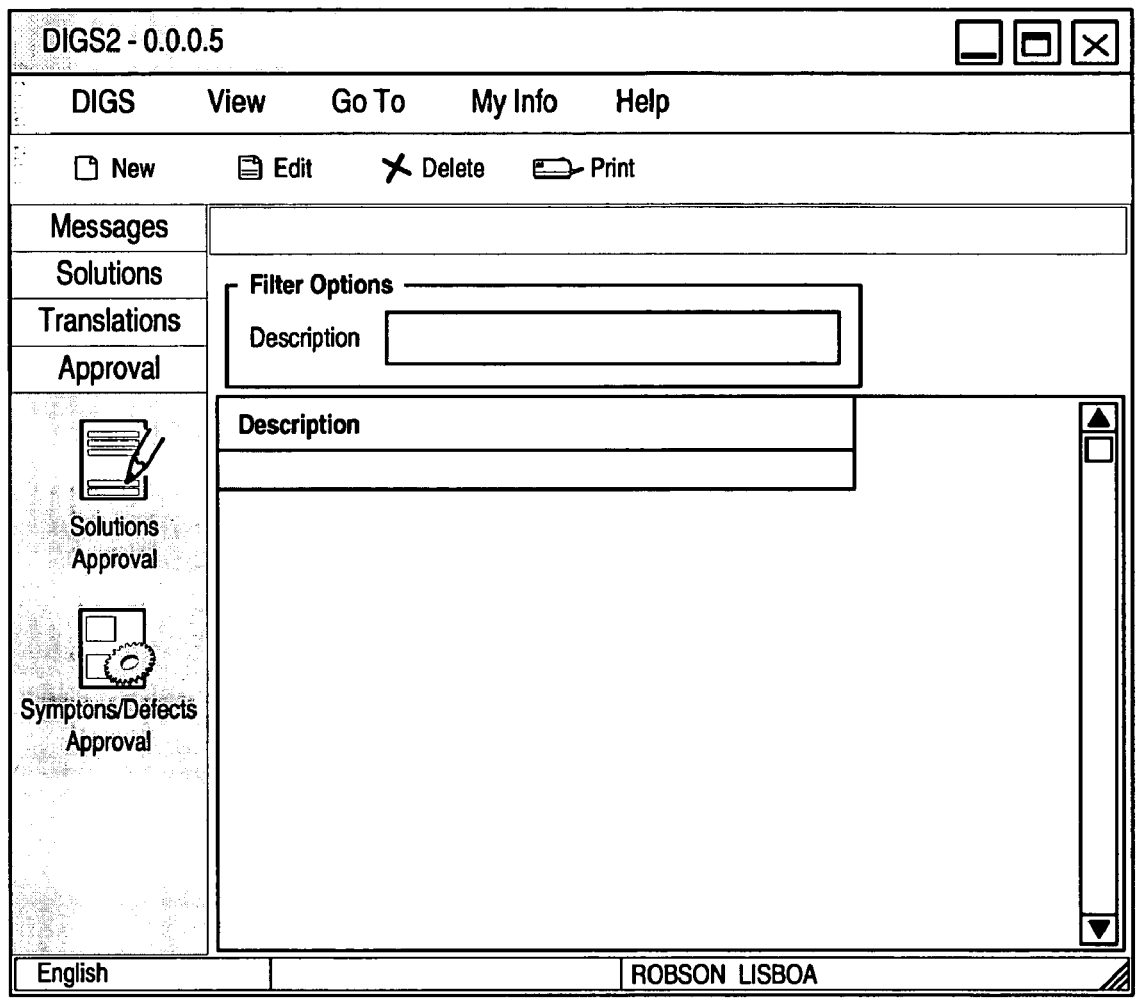
FIG. 6 is a representation, similar to that shown in FIG. 5 of another exemplary display screen generated during operation of the distributed service system shown in FIG. 4.
Figure 7:
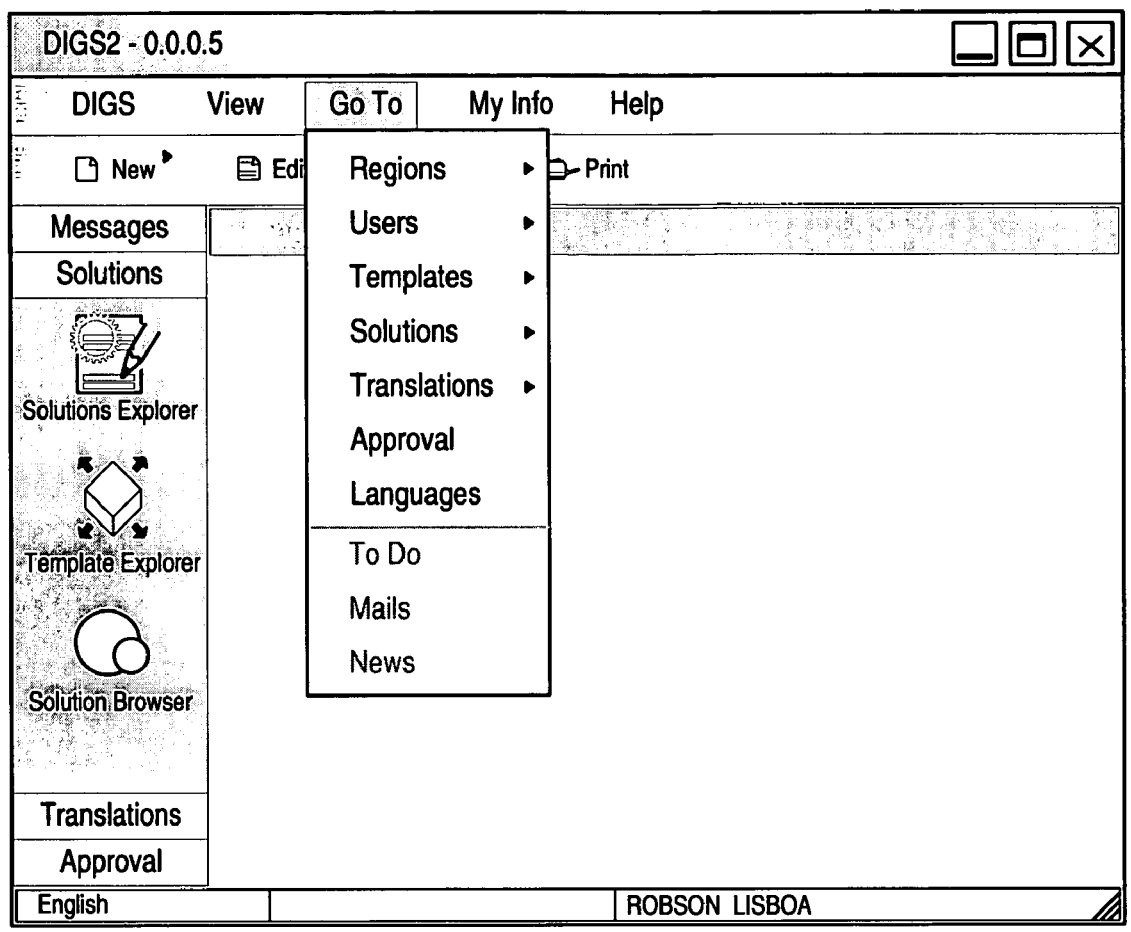
FIG. 7 is a representation, similar to those shown in FIGS. 5-6, but of another exemplary display screen generated during operation of the distributed service system shown in FIG. 4.

FIGS. 6 and 7 illustrates additional exemplary screen template displays, shown generally at 660 and 670 that are also generated during operation of an embodiment of the present invention.

When information, such as a proposed solution to a problem, is entered, the information is sent to a database to be stored thereat. Initially, the information is given the status of not approved. The information is available for review. Subsequent analysis, and approval of the information, causes the status to be changed to a status of approved.

The information is contained in a knowledge tree. And, once the information is approved, the information is available for others to access. The information is stored in a number coded format. From the codes, and based on the selected language, the information is assembled and displayed.

The embodiments described above are preferred examples for implementing the invention, and the scope of the invention should not necessarily be limited by this description. The scope of the present invention is defined by the following claims.

What is claimed is:

1. A distributed service system comprising:
   a first database storing first selected historical information in a first selected spoken language, the first selected historical information comprising first product repair information reported by a first service technician after performing repairs on another product similar to a product being repaired;
   at least a second database storing at least second selected historical information in at least a second selected spoken language, the second selected historical information comprising second product repair information reported by at least a second service technician also after performing repairs on another product similar to the product being repaired; and
   a troubleshooting engine in communication with said first database and said at least second database, said troubleshooting engine for receiving repair information from any of the first and at least second service technicians, and said troubleshooting engine for assembling a repair guide based at least in part on the received information and on selected information of the first selected historical information and the at least the second selected historical information,
   wherein said troubleshooting engine further comprises a translator configured to translate between the first selected spoken language and a different language comprising the second selected spoken language.

2. The distributed service system of claim 1 further comprising a product performance counter (PPC) analysis module for receiving PPC counts from the product and using them to assemble a PPC report, wherein said troubleshooting engine is in communication with the PPC analysis module to receive the PPC report and wherein said troubleshooting engine assembles the repair guide also in part based upon the received PPC report.

3. The distributed service system of claim 1 wherein said first database is embodied at a first location and said second database is embodied at a second location, the second location distributed apart from the first location.

4. The distributed service system of claim 3 wherein the first location at which said first database is embodied is positioned within boundaries of a first geographical area and wherein the second location at which said second database is embodied is positioned within boundaries of a second geographical area.

5. The distributed service system of claim 1 wherein the repair guide assembled by said troubleshooting engine is in a selected one of the first selected spoken language and the at least the second selected spoken language.

6. The distributed service system of claim 5 wherein said translator is further configured for translating at least portions of one of the first selected historical information in the first selected spoken language and the at least second selected historical information in the second selected spoken language into an other of the first and second selected spoken languages.

7. The distributed service system of claim 6 wherein the repair guide assembled by said troubleshooting engine includes a template portion, the template portion selectably in the first selected spoken language and the at least the second selected spoken language.

8. The distributed service system of claim 7 wherein, once formed the repair guide assembled by said troubleshooting engine is accessible by any of the first and at least se configured at a selected one of said first database and said at least second database.

9. The distributed service system of claim 8 wherein the language in which to template portion of the repair guide assembled by said troubleshooting engine is selected, dependent upon which of the first and at least second service technicians selects to access the repair guide.

10. The distributed service system of claim 9 wherein said translator is further for translating the template portion between the first selected spoken language and the at lest the second selected spoken language.

11. The distributed service system of claim 1 further comprising a first point of service, said first point of service used by the first service technician to report the first selected historical information.

12. The distributed service system of claim 11 wherein said first point of service is further used by the first service technician to access the repair guide assembled by said troubleshooting engine.

13. The distributed service system of claim 12 wherein said first point of service comprises a user interface including a user display, the user display including text displayable in a selected one of the first and at least second selected spoken languages.

14. The distributed service system of claim 13 wherein the first service technician selects the selected one of the first and at least second selected spoken languages in which to display the text on the user display.

15. A method comprising:
   collecting first data related to reported defects in products that the service technicians are expected to repair and storing the first data at a first database in a first selected spoken language;
   collecting second data also related to reported defects in products that the service technicians are expected to repair and storing the second data at a second database in a second selected spoken language; and providing a troubleshooting engine for receiving repair-related information from the service technicians and using the repair-related information to prepare a multimedia repair guide for transmission to the service technicians, wherein the repair guide is at least in part based upon at least a selected one of the first data and the second data and wherein the troubleshooting engine further comprises a translator configured to translate between the first selected spoken language and a different language comprising the second selected spoken language.

16. The method of claim 15 wherein the repair-related information provided to the troubleshooting engine includes at least one PPC count and wherein said method further comprises generating a PPC profile using the PPC count, and using the PPC profile to prepare the repair guide.

17. The method of claim 15 wherein the first database at which the first data collected and stored during said first operation of collecting is embodied at a first location, and wherein the second database at which the second data collected and stored during said second operation of collecting is embodied at a second location, the second location distributed apart from the first location.

18. The method of claim 17 wherein the first location at which the first database is embodied is positioned within boundaries of a first geographical area and wherein the second location at which the second database is embodied is positioned within boundaries of a second geographical area.

19. The method of claim 15 further comprising the operation of translating the repair guide formed during said operation of providing between the first selected spoken language and the at least the second selected spoken language.

20. The method of claim 15 wherein the first selected data collected during said first operation of collecting is provided by a first service technician positioned at a first location.

* * * * *

UNITED STATES PATENT AND TRADEMARK OFFICE
CERTIFICATE OF CORRECTION

PATENT NO. : 7,519,604 B2 Page 1 of 1
APPLICATION NO. : 10/652057
DATED : April 14, 2009
INVENTOR(S) : Gomes et al.

It is certified that error appears in the above-identified patent and that said Letters Patent is hereby corrected as shown below:

<u>Column 12,</u>
Lines 29 and 30, "se configured" should read --second service technicians and stored--.

Signed and Sealed this

Eighteenth Day of August, 2009

David J. Kappos
*Director of the United States Patent and Trademark Office*